(12) United States Patent
Chen

(10) Patent No.: US 6,853,165 B2
(45) Date of Patent: Feb. 8, 2005

(54) TWO-STAGE CHARGING DEVICE

(75) Inventor: Seng-Feng Chen, Taipei (TW)

(73) Assignee: Quanta Computer Inc., Tao Yuan Shien (TW)

( * ) Notice: Subject to any disclaimer, the term of this patent is extended or adjusted under 35 U.S.C. 154(b) by 57 days.

(21) Appl. No.: 10/379,032

(22) Filed: Mar. 4, 2003

(65) Prior Publication Data

US 2004/0108838 A1 Jun. 10, 2004

(30) Foreign Application Priority Data

Dec. 4, 2002 (TW) ........................................ 91135136 A

(51) Int. Cl.[7] ................................................. H02J 7/00
(52) U.S. Cl. ....................................................... 320/137
(58) Field of Search ................................ 320/137, 139, 320/162–164, 134, 136, 133; 323/908

(56) References Cited

U.S. PATENT DOCUMENTS

| | | | |
|---|---|---|---|
| 5,982,148 A | * 11/1999 | Mercer | ........................ 320/134 |
| 6,137,265 A | * 10/2000 | Cummings et al. | .......... 320/133 |
| 6,326,771 B1 | * 12/2001 | Popescu-Stanesti | .......... 320/139 |

FOREIGN PATENT DOCUMENTS

TW 434966 5/2001

* cited by examiner

Primary Examiner—Pia Tibbits

(57) ABSTRACT

A two-stage charging device including a power supply device and a battery module is provided. The battery module is equipped with a linear charging device, a controller and a battery. During the charging process, the controller determines the voltage difference between the main supply voltage provided by the power supply device and the battery voltage, and then outputs an adjusting signal to the power supply device according to the obtained voltage difference. Then the power supply device adjusts the supply voltage according to the adjusting signal to maintain the voltage difference between the supply voltage and the battery voltage approximately at a pre-set voltage level. The battery voltage will rise along with the passing of the charging time. If the voltage difference between the main supply voltage and the battery voltage is smaller than a lower voltage level, the controller will increase the voltage level of the adjusting signal so as to increase the power supplied by the power supply device. Conversely, if the voltage difference between the supply voltage and the battery voltage is larger than an upper voltage level, the controller will reduce the voltage level of the adjusting signal to enable power supply device to reduce the power supplied by the power supply device. Therefore, by making appropriate adjustments according to the level of the adjusting signal, the main supply voltage can be maintained at a voltage level slightly above the battery voltage.

21 Claims, 3 Drawing Sheets

TWO-STAGE CHARGING DEVICE

This application claims the benefit of Taiwan application Serial No. 091135136, filed on Dec. 4, 2002.

BACKGROUND OF THE INVENTION

1. Field of the Invention

The invention relates in general to a charging device, and more particularly to a two-stage charging device.

2. Description of the Related Art

In order to make the electronic products more compact and light, developers are searching for a breakthrough in the design of portable electronic devices. The design of a notebook computer, for example, not only needs to be compact, but also requires considerations about the battery duration and heat dissipation problems. How to miniaturize the product and at the same time reduce its heat dissipation thus becomes an important issue.

Portable electronic devices normally use batteries as the power supply; and the rechargeable battery module is normally adopted. The design of a charging device is particularly important when both the efficiency and the stability of power supply are considered. The charging device typically has a power supply device and a control device, wherein the power supply device serves as a necessary power supply during charging of the battery, and the control device controls the charging process. The most commonly used power supply devices fall into two categories: the linear voltage regulator and the switching voltage regulator, with which respective advantages and disadvantages are associated. Despite having the advantage of a simple circuit design, the linear voltage regulator has a low efficiency when the voltage difference between the input voltage and the output voltage is large. In contrast to the linear voltage regulator, the switching voltage regulator, despite having a higher efficiency, has a complicated circuit design which is unfavorable for the miniaturization of the circuit.

FIG. 1 is a schematic diagram of a conventional linear charging device. As shown in FIG. 1, the power supply device 110 has a main power supply Vs for charging a battery BT The battery BT has a battery voltage Vb. When battery voltage Vb drops too low, the drive device 130 enables the transistor Q, allowing the battery BT to be charged by the main supply voltage Vs via the transistor Q. Along with the passing of the charging time, the battery voltage Vb of the battery BT rises. When the battery BT is saturated, the drive device 130 cuts off the power supply Vs to the battery BT by disabling the transistor Q. This method may appear to be simple. However, charging efficiency may be significantly reduced when the transistor Q consumes a large amount of energy because of large difference between the main supply voltage Vs and the battery voltage Vb. In order to use precious energy more efficiently and to prevent the transistor Q from being destroyed when the transistor Q is overloaded, the conventional charging device needs to be further improved.

SUMMARY OF THE INVENTION

It is therefore an object of the invention to provide a two-stage charging device to solve the miniaturization and heat dissipation problems of the charging device.

According to the object of the invention, a two-stage charging device is provided.

The two-stage charging device includes a power supply and a battery module wherein the battery module is equipped with a linear charging device, a controller and a battery. During the charging process, the controller determines the difference between a main supply voltage provided by the power supply and the voltage of the battery, and outputs an adjusting signal to the power supply according to the obtained voltage difference. The power supply device then adjusts the main supply voltage according to the adjusting signal to maintain the voltage difference between the main supply voltage and the battery voltage approximately at a pre-set voltage level. The battery voltage will increase along with the passing of the charging time. When the voltage difference between the main supply voltage and the battery voltage is smaller than a lower voltage level, the controller will raise up the voltage level of the adjusting signal. Conversely, when the voltage difference between the main supply voltage and the battery voltage is larger than an upper voltage level, the controller will reduce the voltage level of the adjusting signal so as to cause the power supply device to reduce its output power. Therefore, by appropriately adjusting the main supply voltage according to the level of the adjusting signal, the main supply voltage can be maintained at a voltage level slightly above the battery voltage.

Other objects, features, and advantages of the invention will become apparent from the following detailed description of the preferred but non-limiting embodiment. The following description is made with reference to the accompanying drawings.

DETAILED DESCRIPTION OF THE INVENTION

The main concept of the invention is to integrate a charging circuit into a battery module. If a linear voltage regulator is adopted, a large amount of heat will be generated inside the battery module when the voltage difference between the supply voltage and the battery voltage is too large. On the other hand, if a switching voltage regulator is adopted, its complicated circuit design is unfavorable to the design of miniaturization. Moreover, a switching voltage regulator also generates a certain amount of heat during its operation and requires a certain space of room for heat dissipation. Therefore, the switching voltage regulator has only limited benefits but is unfavorable in terms of miniaturization when integrated into a battery module.

The invention aims to resolve the heat dissipation problem encountered when a linear voltage regulator is integrated into a battery module. The details of the embodiment are disclosed below.

In the conventional practice, the linear charging device generates a large amount of heat due to a large difference between the main supply voltage Vs and the battery voltage Vb. This not only causes heat dissipation problem but also reduces the efficiency of charging significantly. The most straightforward way to resolve the above problem is to decrease the voltage difference between the main supply voltage Vs and the battery voltage Vb to a small range and maintain the voltage difference within the small range, say, about 0.5V for instance. During charging, the main supply voltage Vs will increase as well when the battery voltage Vb rises up, so unnecessary power loss can be avoided and the amount of heat generated can be reduced.

Figure 1:
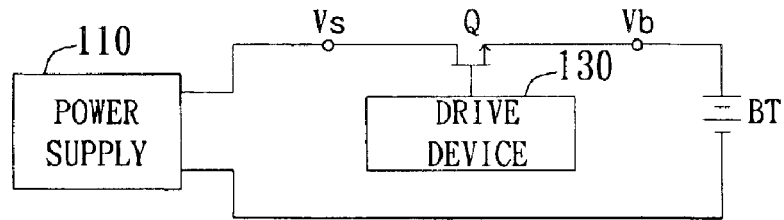
FIG. 1 is a schematic diagram of a conventional linear charging device.
Figure 2:
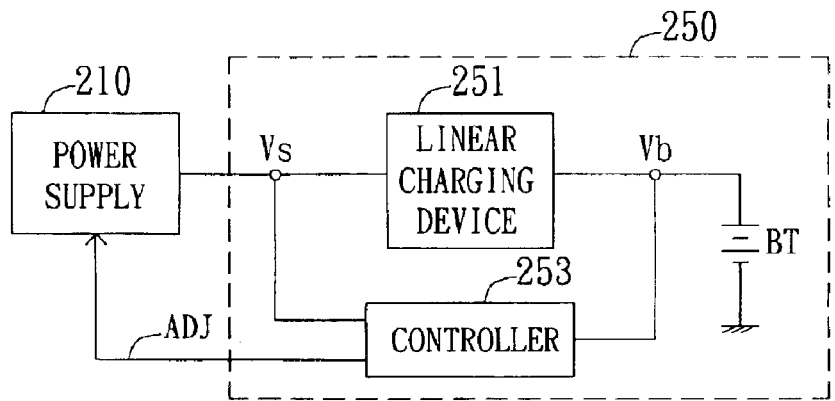
FIG. 2 is a block diagram of a two-stage charging device according to a preferred embodiment of the invention.
Figure 3:
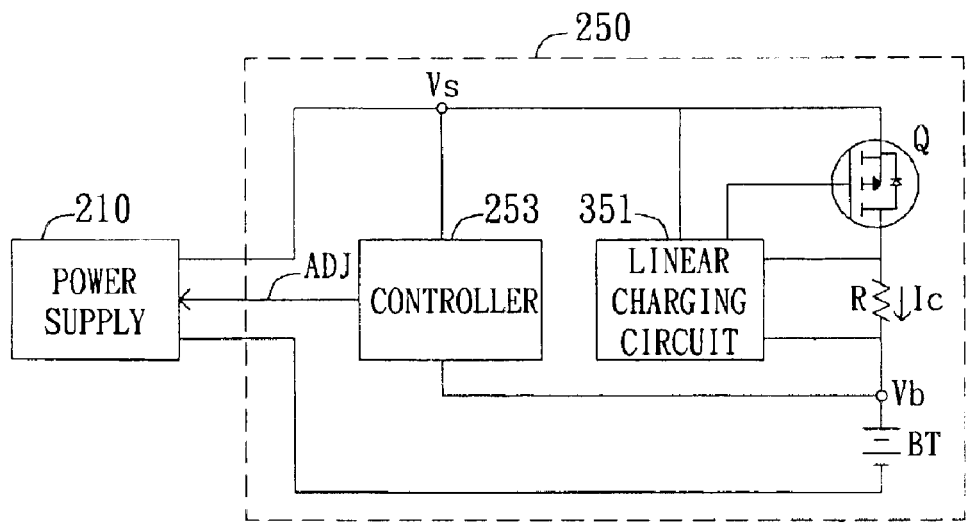
FIG. 3 shows the circuit structure of the linear charging device in FIG. 2.

Please refer to FIG. 2, a block diagram for a two-stage charging device according to the preferred embodiment of the invention. The two-stage charging device includes a power supply device 210 and a battery module 250 wherein the power supply device 210 can be a switching voltage regulator while the battery module 250 is equipped with a linear charging device 251, a controller 253 and a battery BT. During charging, the controller 253 outputs an adjusting signal ADJ to the power supply device 210 according to the voltage difference between the main supply voltage Vs and the battery voltage Vb; the power supply device 210 will adjust the main supply voltage Vs according to the adjusting signal ADJ to maintain the voltage difference between the main supply voltage Vs and the battery voltage Vb at a preset voltage level, about 0.5 V for instance. Referring to FIG. 3, the circuit structure of the linear charging device 251 of FIG. 2 is further illustrated. The linear charging device 251 of FIG. 2 includes a linear charging circuit 351, a transistor Q and a resistor R wherein the transistor Q can be a P-channel metal oxide semiconductor field effect transistor (PMOS transistor). The linear charging circuit 351 controls the transistor Q, for example, switching the transistor Q on and off, so as to enable the main power supply Vs to charge the battery BT via the transistor Q. The resistor R, on the other hand, is used to measure the charging current Ic whereby the linear charging circuit 351 can control the current and determine whether the charging is completed.

Figure 4:
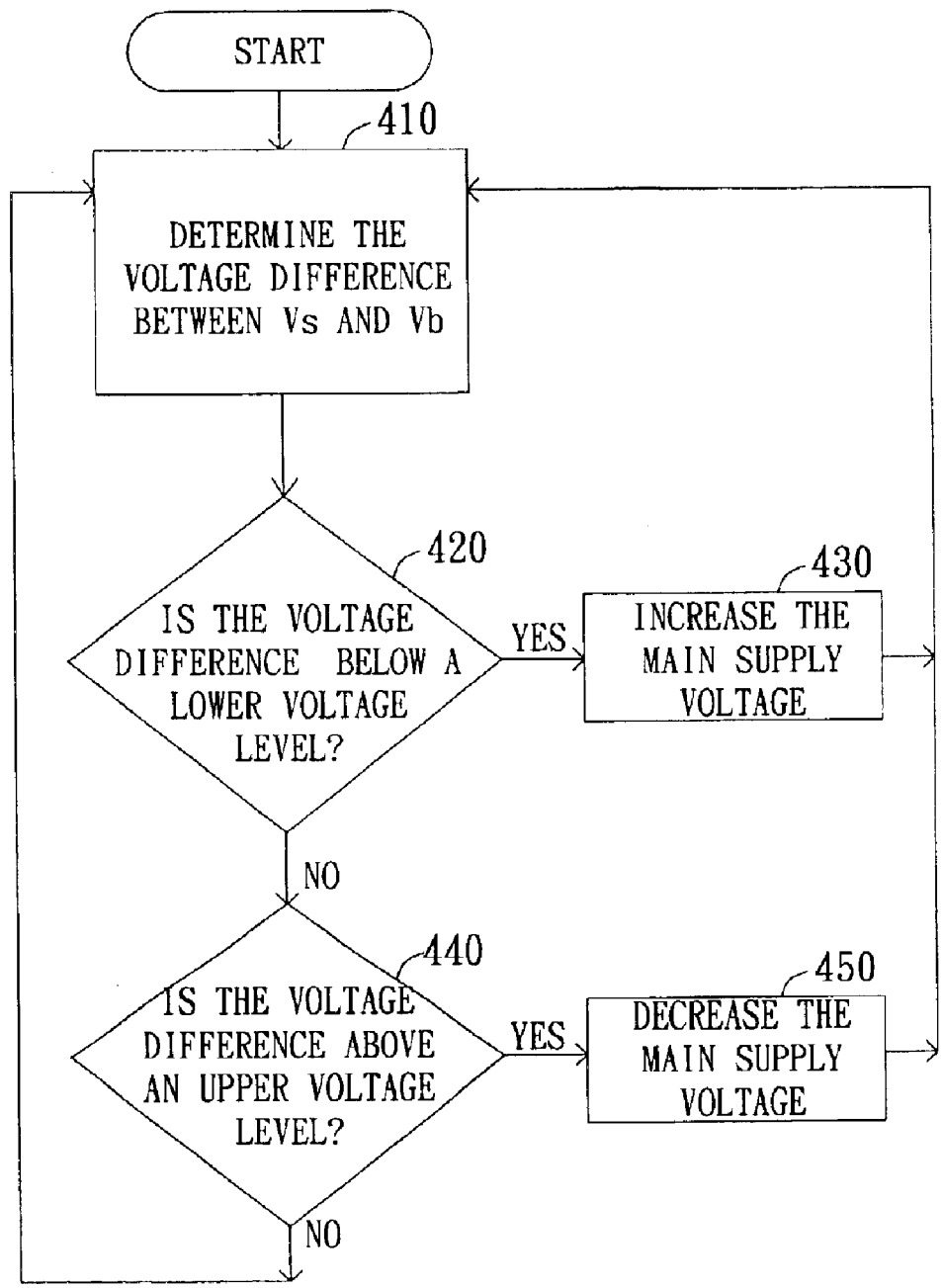
FIG. 4 is a charging method flowchart for a two-stage charging device.

FIG. 4 is a flowchart showing a charging method for a two-stage charging device according to the invention. For the sake of convenience, suppose that a battery BT, for example, a battery set of four serially connected lithium batteries, needs to be charged from a level of 12V up to a level of 16.8V and that the main supply voltage Vs, during the changing process, rises along with the rising of the battery voltage Vb and is maintained at a voltage level approximately 0.5V above the battery voltage Vb. Suppose the battery BT is 12V when the charging starts. The controller 253 outputs an adjusting signal ADJ according to the voltage difference between the main supply voltage Vs and the battery voltage Vb, and then the power supply 210 supplies a main supply voltage Vs of 12.5V according to the voltage level of the adjusting signal ADJ. During the charging process, the controller 253 keeps determining the voltage difference between the main supply voltage Vs and the battery voltage Vb, and the voltage difference serves as the basis of adjustment for the adjusting signal ADJ, as indicated by step 410. Along with the passing of the charging time, the battery voltage Vb gradually rises. As indicated in step 420, a determination is made as to whether the voltage difference between the main supply voltage Vs and the battery voltage Vb is smaller than a lower voltage level, say, 0.4V. If so, the controller 253 will increase the voltage level of the adjusting signal ADJ to enable the power supply device 210 to increase the power supplied by the main power supply Vs, as shown in step 430. For example, when the battery voltage Vb rises above 12.1V, the controller 253 will increase the adjusting signal ADJ to enable the main supply voltage Vs to increase accordingly. If the voltage difference is not smaller than the lower voltage level, a determination is made as to whether the voltage difference between the supply voltage Vs and the battery voltage Vb is larger than an upper voltage level, say, 0.6V, as shown in step 440. If the voltage difference is larger than the upper voltage level, the controller 253 will reduce the voltage level of the adjusting signal ADJ so as to make the power supply device 210 reduce the power supplied by the main power Vs, as indicated by step 450. Therefore, the main supply voltage Vs can be appropriately adjusted according to the level of the adjusting signal ADJ and be maintained at a voltage level approximately 0.5V above that of the battery voltage Vb.

Since the main supply voltage Vs is adjusted according to its difference with the battery voltage Vb, the main supply voltage Vs can be maintained at a voltage level slightly above the battery voltage Vb, restricting the heat dissipation inside the battery module 250 within a permissible range. The charging process will be completed when the voltage of the battery BT rises up to 16.8V while the main supply voltage Vs which stays at 17.3V will increase no more.

Figure 5:
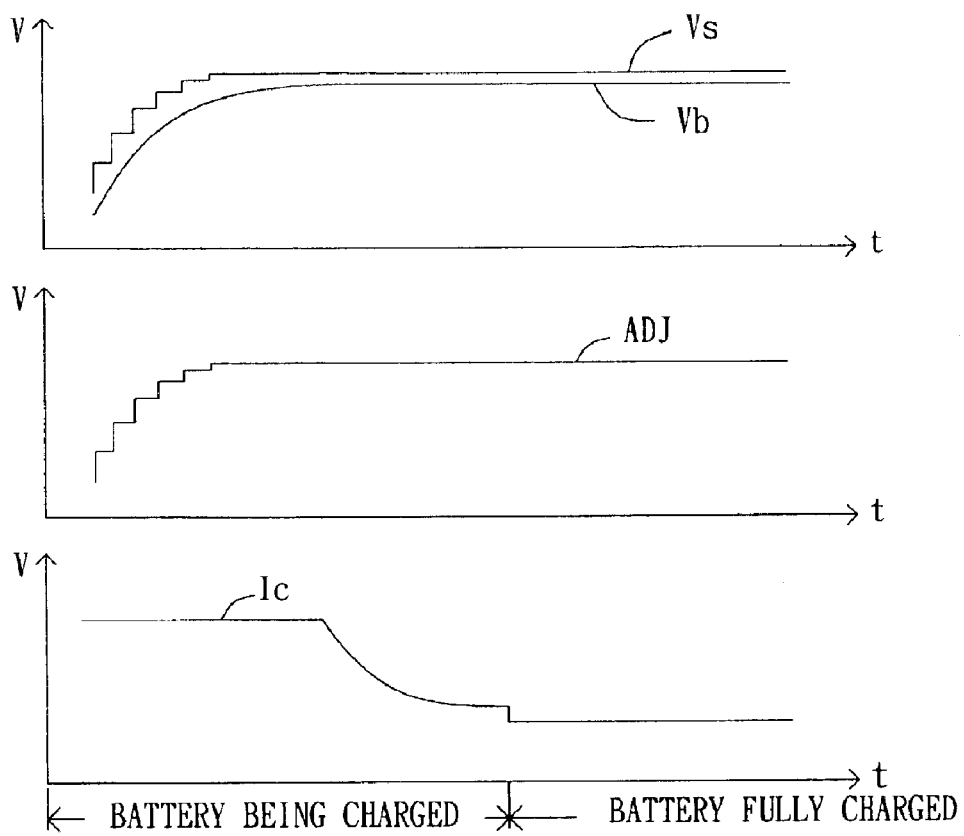
FIG. 5 illustrates the relationship between the main supply voltage, the battery voltage, the adjusting signal and the charging current during charging.

FIG. 5 illustrates the relationship between the main supply voltage, the battery voltage, the adjusting signal and the charging current during charging. As can be examined from FIG. 5, the battery voltage Vb shows a smooth rising curve during charging. When the voltage difference between the main supply voltage Vs and the battery voltage Vb is smaller than 0.4V, the voltage level of the adjusting signal ADJ increases so that the main supply voltage Vs rises accordingly, resulting in a proportional relationship between the adjusting signal ADJ and the main supply voltage Vs. Moreover, the charging current Ic, which almost remains unchanged during charging, gradually fades out after the completion of charging.

The two-stage charging device according to the preferred embodiment of the invention disclosed above includes at least the following advantages:

1. Miniaturization of electronic products is furthered by the integration of the controller and the linear charging device into the battery module.
2. Overall cost can be saved because the integration of the linear charging device into the battery module not only increases charging efficiency but also reduces heat dissipation.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A two-stage charging device, comprising:
   a power supply device providing a power supply voltage; and
   a battery module coupled to the power supply device, the battery module comprising:
     a battery;
     a linear charging device, coupled to both the power supply device and the battery, for charging the battery according to the power supply voltage, wherein the battery has a battery voltage; and
     a controller, coupled to both the power supply device and the battery, for producing an adjusting signal according to a voltage difference between the power supply voltage and the battery voltage, wherein the power supply voltage is adjusted according to the adjusting signal;

wherein during charging, the power supply device adjusts the power supply voltage according to the adjusting signal to make the voltage difference between the power supply voltage and the battery voltage in a range of a predetermined lower voltage level to a predetermined upper voltage level so that heat dissipated by the linear charging device is reduced.

2. The two-stage charging device according to claim 1, wherein the adjusting signal makes the power supply voltage increase by one voltage unit when the voltage difference is below the predetermined lower voltage level, and makes the power supply voltage decrease by one voltage unit when the voltage difference is above the predetermined upper voltage level.

3. The two-stage charging device according to claim 2, wherein the lower voltage level is about 0.4V.

4. The two-stage charging device according to claim 2, wherein the upper voltage level is about 0.6V.

5. The two-stage charging device according to claim 1, wherein the power supply device is a switching voltage regulator.

6. The two-stage charging device according to claim 1, wherein the linear charging device comprises:
   a transistor coupled to both the power supply device and the battery; and
   a linear charging circuit, coupled to the transistor, for controlling the transistor to charge the battery.

7. The two-stage charging device according to claim 6, wherein the linear charging device further comprises:
   a resistor, coupled to the linear charging circuit and coupled between the transistor and the battery, for measuring the charging current flowing into the battery.

8. The two-stage charging device according to claim 6, wherein the adjusting signal makes the power supply voltage increase by one voltage unit when the voltage difference is below the predetermined lower voltage level, and makes the power supply voltage decrease by one voltage unit when the voltage difference is above the predetermined upper voltage level.

9. The two-stage charging device according to claim 8, wherein the lower voltage level is about 0.4V.

10. The two-stage charging device according to claim 8, wherein the upper voltage level is about 0.6V.

11. The two-stage charging device according to claim 8, wherein the power supply device is a switching voltage regulator.

12. The two-stage charging device according to claim 1, wherein the two-stage charging device performs a charging method including the steps of:
   determining the voltage difference between the power supply voltage and the battery voltage;
   increasing the power supply voltage if the voltage difference is below the predetermined lower voltage level; and
   decreasing the power supply voltage if the voltage difference is above the predetermined upper voltage level.

13. The two-stage charging device according to claim 12, wherein the lower voltage level is about 0.4V.

14. The two-stage charging device according to claim 12, wherein the upper voltage level is about 0.6V.

15. A two-stage charging device, comprising:
   a power supply device providing a power supply voltage; and
   a battery module coupled to the power supply device, the battery module comprising:
      a battery having a battery voltage;
      a linear charging device, coupled to both the power supply device and the battery, for charging the battery according to the power supply voltage; and
      a controller, coupled to both the power supply device and the battery, for producing an adjusting signal according to a voltage difference between the power supply voltage and the battery voltage, wherein the power supply voltage is adjusted according to the adjusting signal;
   wherein during charging, the controller increases a voltage level of the adjusting signal so as to increase power supplied by the power supply device when the voltage difference is smaller than a predetermined lower voltage level;
   wherein during charging, the controller reduces a voltage level of the adjusting signal to enable the power supply device to reduce the power supplied by the power supply device when the voltage difference is larger than a predetermined upper voltage level; and
   wherein during charging, the power supply device adjusts the power supply voltage according to the adjusting signal to make the voltage difference in the range of the predetermined lower voltage level to the predetermined_upper voltage level so that heat dissipated by the linear charging device is reduced.

16. The two-stage charging device according to claim 15, wherein the linear charging device comprises:
   a transistor coupled to both the power supply device and the battery; and
   a linear charging circuit, coupled to the transistor, for controlling the transistor to charge the battery.

17. The two-stage charging device according to claim 16, wherein the linear charging device further comprises:
   a resistor, coupled to the linear charging circuit and coupled between the transistor and the battery, for measuring the charging current flowing into the battery.

18. A battery module, wherein a power supply device provides a power supply voltage to the battery module, the battery module comprising:
   a battery having a battery voltage;
   a linear charging device, coupled to both the power supply device and the battery, for charging the battery according to the power supply voltage; and
   a controller, coupled to both the power supply device and the battery, for producing an adjusting signal according to a voltage difference between the power supply voltage and the battery voltage, wherein the power supply voltage is adjusted according to the adjusting signal;
   wherein during charging, the power supply device adjusts the power supply voltage according to the adjusting signal to make the voltage difference between the power supply voltage and the battery voltage in a range of a predetermined_lower voltage level to a predetermined_upper voltage level so that heat dissipated by the linear charging device is reduced.

19. The battery module according to claim 18:
   wherein during charging, the controller increases a voltage level of the adjusting signal so as to increase power supplied by the power supply device when the voltage difference is smaller than the predetermined lower voltage level; and wherein during charging, the controller reduces a voltage level of the adjusting signal to enable the power supply device to reduce the power supplied by the power supply device when the voltage difference is larger than the predetermined upper voltage level.

20. The battery module according to claim 18, wherein the linear charging device comprises:

a transistor coupled to both the power supply device and the battery; and a linear charging circuit, coupled to the transistor, for controlling the transistor to charge the battery.

21. The battery module according to claim 20, wherein the linear charging device further comprises:

a resistor, coupled to the linear charging circuit and coupled between the transistor and the battery, for measuring the charging current flowing into the battery.

* * * * *